United States Patent
Lim et al.

(10) Patent No.: US 7,732,981 B2
(45) Date of Patent: Jun. 8, 2010

(54) ULTRASONIC MOTOR HAVING LIGHTWEIGHT VIBRATING ELEMENT

(75) Inventors: Ji-hyuk Lim, Suwon-si (KR); Jin-woo Cho, Seongnam-si (KR); Sung-hyuk Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/345,983

(22) Filed: Dec. 30, 2008

(65) Prior Publication Data

US 2010/0033056 A1     Feb. 11, 2010

(30) Foreign Application Priority Data

Aug. 5, 2008     (KR) .................. 10-2008-0076706

(51) Int. Cl.
*H02N 2/00*     (2006.01)
(52) U.S. Cl. .................... 310/323.11; 310/323.04
(58) Field of Classification Search ............ 310/323.03, 310/323.04, 323.09, 323.11, 323.15

See application file for complete search history.

(56) References Cited

U.S. PATENT DOCUMENTS

| 5,448,127 A | 9/1995 | Kanazawa |
| 2006/0043845 A1* | 3/2006 | Maruyama et al. .......... 310/358 |

FOREIGN PATENT DOCUMENTS

| JP | 02-036773 | * | 2/1990 |
| JP | 03222679 A | | 10/1991 |
| JP | 07123747 A | | 5/1995 |
| JP | 2002010657 A | | 1/2002 |
| JP | 2005-218191 | * | 8/2005 |

* cited by examiner

*Primary Examiner*—Thomas M Dougherty
(74) *Attorney, Agent, or Firm*—Sughrue Mion, PLLC

(57) ABSTRACT

An ultrasonic motor includes a vibrating element having a piezoelectric body attached thereto to produce a traveling wave when the piezoelectric body is supplied with an electric power, and a contacting element to come in friction contact with the vibrating element when the vibrating element is vibrated by the traveling wave. The vibrating element is formed of a Mg-based alloy having a Mg content of more than 85% by weight.

17 Claims, 6 Drawing Sheets

ULTRASONIC MOTOR HAVING LIGHTWEIGHT VIBRATING ELEMENT

CROSS-REFERENCE TO RELATED PATENT APPLICATION

This application claims priority from Korean Patent Application No. 10-2008-76706 filed on Aug. 5, 2008 in the Korean Intellectual Property Office, the entire disclosure of which is incorporated herein by reference.

BACKGROUND OF THE INVENTION

1. Field of the Invention

Apparatuses consistent with the present invention relate to an ultrasonic motor, and more particularly, to an ultrasonic motor with a vibrating element having a reduced weight while maintaining a required performance.

2. Description of the Related Art

Generally, an ultrasonic motor, for example, a traveling wave type hollowed ultrasonic motor, includes a vibrating element which generates a vibration, and a contacting element which rotates according to the vibration of the vibrating element. To generate the vibration, the vibrating element is provided with a piezoelectric body, which generates deformations or displacements due to a piezoelectric effect when it is applied with a voltage having a high frequency of more than 20 kHz.

Such an ultrasonic motor can be driven without separate reduction gears because it is driven at a low speed and a low torque unlike an electromagnetic motor driven at a high speed and a high torque. Further, the ultrasonic motor has a self-breaking function by using a friction force, enables a precise position control, and is compact, so that it can be applied to various system or devices. Accordingly, the ultrasonic motor is widely used in apparatuses, such as robots, medical treatment machinery and tools, optical devices, semiconductor inspection equipments, building automation systems, etc., which require an ultra-precision position control.

However, to allow the ultrasonic motor to have the required performance, it is necessary for the vibrating element to sufficiently transmit the vibration by the deformations of the piezoelectric body to the contacting element and thus to generate sufficient displacements on a contacting surface with the contacting element, and to have a proper coefficient of friction and a proper abrasion resistance on the contacting surface with the contacting element.

To meet such a condition, the vibrating element is usually formed of a material having a sufficient hardness and a sufficient abrasion resistance, for example, a bronze material, or a steel material, such as a quenched steel, a tool steel, a stainless steel, etc. However, because the materials as described above have a low machinability, they increase a machining cost in forming of the vibrating element, and thus a fabrication cost of the ultrasonic motor is increased. Also, because the materials are heavy, they impose restrictions on the range of systems or devices to which the ultrasonic motor can be used.

SUMMARY OF THE INVENTION

Exemplary embodiment of the present invention addresses at least the above aspects. Accordingly, an aspect of the present invention is to provide an ultrasonic motor with a vibrating element, which can reduce a weight and improve a machinability while maintaining a required performance, thereby allowing it to apply to many more systems and devises.

Additional aspects of the invention will be set forth in part in the description which follows and, in part, will be obvious from the description, or may be learned by practice of the invention.

According to one aspect of an exemplary embodiment of the present invention, there is provided an ultrasonic motor including a vibrating element, a piezoelectric body which is attached to the vibrating element and produces a traveling wave when the piezoelectric body is supplied with an electric power, and a contacting element which comes into friction contact with the vibrating element when the vibrating element is vibrated by the traveling wave. The vibrating element is formed of a Mg-based alloy more than 85% by weight of Mg.

The vibrating element may be formed to have a quality factor Q of about 100 to about 500. The quality factor Q may be more than 250.

The Mg-based alloy may include 1 to 15% by weight of at least one material selected from a group consisting of Al, Zn and Mn.

The Mg-based alloy may include 2.5 to 3.5% by weight of the Al, 0.7 to 1.3% by weight of the Zn, 0.2 to 1.0% by weight of the Mn, less than 0.3% by weight of materials other than the Al, the Zn, the Mn and the Mg, and a remaining % by weight of the Mg.

The Mg-based alloy may include 7.5 to 10.5% by weight of the Al, 0.4 to 2.4% by weight of the Zn, 0.1 to 0.3% by weight of the Mn, less than 0.05% by weight of Si, less than 0.05% by weight of Cu, less than 0.01% by weight of Ni, less than 0.01% by weight of Fe, less than 0.3% by weight of materials other than the Al, the Zn, the Mn, the Si, the Cu, the Ni, the Fe and the Mg, and a remaining % by weight of the Mg.

The Mg-based alloy may include 1.7 to 10.5% by weight of the Al, less than 0.2% by weight of the Zn, 0.25 to 0.6% by weight of the Mn, less than 0.1% by weight of Si, less than 0.01% by weight of Cu, less than 0.01% by weight of Ni, less than 0.01% by weight of Fe, less than 0.3% by weight of materials other than the Al, the Zn, the Mn, the Si, the Cu, the Ni, the Fe and the Mg, and a remaining % by weight of the Mg.

The Mg-based alloy may include 0.9 to 1.5% by weight of the Mn, Ca less than 0.3% by weight of Ca, less than 0.1% by weight of Cu, less than 0.05% by weight of Ni, less than 0.1% by weight of Si, less than 0.3% by weight of materials other than the Mn, the Ca, the Cu, the Ni, the Si, and the Mg, and a remaining % by weight of the Mg.

The Mg-based alloy may include 5.8 to 6.8% by weight of the Al, 0.5 to 1.2% by weight of the Zn, 0.2 to 0.5% by weight of the Mn, 0.01 to 0.05% by weight of Si, less than 0.05% by weight of Cu, less than 0.05% by weight of Ni, less than 0.05% by weight of Fe, less than 0.3% by weight of materials other than the Al, the Zn, the Mn, the Si, the Cu, the Ni, the Fe and the Mg, and a remaining % by weight of the Mg.

The Mg-based alloy may include 3.8 to 6.5% by weight of the Zn, 0.1 to 1.0% by weight of the Zr, less than 0.3% by weight of materials other than the Zn, the Zr and the Mg, and a remaining % by weight of the Mg.

The Mg-based alloy may include 4 to 15% by weight of at least one material selected from a group consisting of Y and Nd.

The Mg-based alloy may include at least 3% by weight of the Y and at least 1% by weight of the Nd.

The Mg-based alloy may include 3.5 to 5.5% by weight of the Y, 1.5 to 2.5% by weight of the Nd, 0.3 to 1.0% by weight of Zr, less than 3% by weight of materials other than the Y, the Nd, the Zr and the Mg, and a remaining % by weight of the Mg.

The Mg-based alloy may include 0.3 to 1.0% by weight of Zr, less than 3% by weight of materials other than the Zr and the Mg, and a remaining % by weight of the Mg.

The vibrating element may further include an abrasion resistance-coating layer coated on a contacting surface thereof coming in friction contact with the contacting element.

According to one aspect of an exemplary embodiment of the present invention, there is provided an ultrasonic motor including a vibrating element, a piezoelectric body which is attached to the vibrating element and produces a traveling wave when the piezoelectric body is supplied with an electric power, and a contacting element in which comes into friction contact with the vibrating element when the vibrating element is vibrated by the traveling wave, The vibrating element is formed of a Mg-based alloy having a quality factor Q of about 100 to about 500.

The quality factor Q may be more than 250.

BRIEF DESCRIPTION OF THE DRAWINGS

The above aspects and features of the present invention will be more apparent from the description for exemplary embodiment of the present invention taken with reference to the accompanying drawings, in which.

Throughout the drawings, the same drawing reference numerals will be understood to refer to the same elements, features, and structures.

DETAILED DESCRIPTION OF ILLUSTRATIVE, NON-LIMITING EMBODIMENTS OF THE INVENTION

Figure 1:
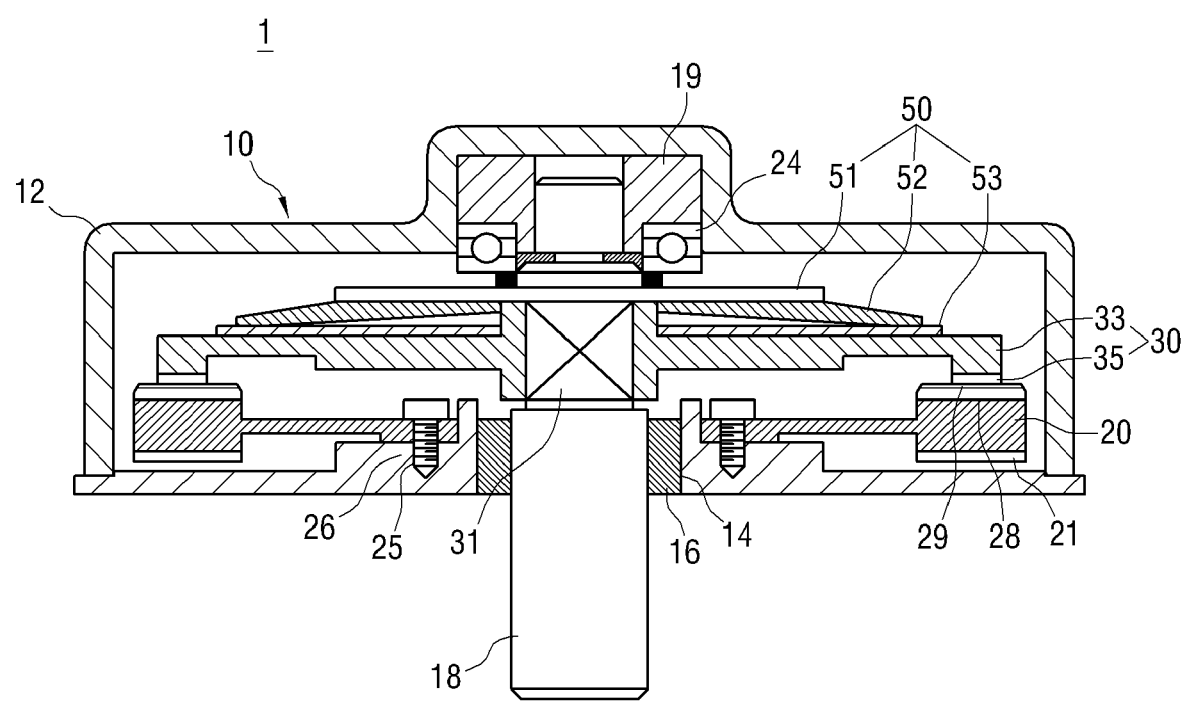
FIG. 1 is a cross-sectional view exemplifying an ultrasonic motor in accordance with an exemplary embodiment of the present invention.

Reference will now be made in detail to an exemplary embodiment of the present invention, which are illustrated in the accompanying drawings, wherein like reference numerals refer to the like elements throughout. The exemplary embodiment is described below in order to explain the present invention by referring to the figures.

FIG. 1 is a cross-sectional view exemplifying an ultrasonic motor in accordance with an exemplary embodiment of the present invention.

As shown in FIG. 1, the ultrasonic motor 1 in accordance with the exemplary embodiment of the present invention, as a traveling wave type hollowed ultrasonic motor, includes a housing 10, a vibrating element 20, and a contacting element 30.

The housing 10 may be a cylindrical casing 12. A shaft hole 14 is formed in the middle of a lower part of the cylindrical casing 12, and a first bearing 16 is inserted into and fixed to the shaft hole 14. A rotary shaft 18 is inserted into the first bearing 16 to penetrate the first bearing 16, and is supported by a shaft support 19 arranged in an upper part of the cylindrical casing 12.

A second bearing 24 is inserted in a lower part of the shaft support 19 so that the rotary shaft 18 smoothly rotates. A compressing unit 50 is disposed under the second bearing 24 to bring the contacting element 30 into press contact with the vibrating element 20.

The compressing unit 50 is provided with a pressing plate 51, a dish spring 52, and an elastic member 53. The pressing plate 51 is arranged under the second bearing 24. The dish spring 53 is located under the pressing plate 51, so that it brings the contacting element 30 in press contact with the vibrating element 20. The elastic member 53 evenly distributes a pressure by an elastic force of the dish spring 52 over the contacting element 30. With the compressing unit 50, the contacting element 30 is compressed to the vibrating element 20.

The contacting element 30, as a rotor, is fixed to a contacting fixing part 31 formed on the rotary shaft 18, and provides a rotating force to the rotary shaft 18. An outer end of the contacting element 30 protrudes downward to form a projection part 33. The projection part 33 has a friction material layer 35 attached thereon to increase a friction force and to reduce a wear when the projection part 33 comes in press contact with the vibrating element 20.

The vibrating element 20, in which comes into press contact with the friction material layer 35 of the contacting element 30, is disposed in the lower part of the cylindrical casing 12. Here, the vibrating element 20 is fixed to the lower part of the cylindrical casing 12 by bolts 26 inserted in bolt fixing holes 25, so that the vibrating element acts as a stator. The vibrating element 20 has a piezoelectric body 21 attached on an undersurface thereof to produce a traveling wave when an electric power is applied to the piezoelectric body 21. The vibrating element 20 is deformed or displaced by the traveling wave produced by the piezoelectric body 21, so that it is compressed to the contacting element 30 while vibrating.

The piezoelectric body 21 is formed of a hollowed ceramic disk, which is minutely displaced or deformed due to a piezoelectric effect to generate a vibration. The hollowed ceramic disk is divided into first and second phases (not shown), each of which has positive poles and negative poles alternately polarized. The first and the second phases are respectively applied with alternating voltages in sine form and cosine form, which have the same magnitude and frequency, so that they generate a single sine wave, respectively. To form an even single traveling wave when the two sine waves are mixed up, a phase different of $\lambda/4$ (where $\lambda$ is a length of a wavelength of the traveling wave produced in a circumferential direction) should exist between the two sine waves. Thus, the first and the second phases are disposed to have gaps spaced apart as much as $\lambda/4$ and $3\lambda/4$ between respective opposite ends thereof The gaps are not applied with the voltages, but grounded or connected to a sensing unit (not shown).

The piezoelectric body 21 formed as described above produces the traveling wave when the voltages are applied thereto and thereby generates minute displacements or deformations in the form of the traveling wave (i.e., a ripple).

Figure 2:
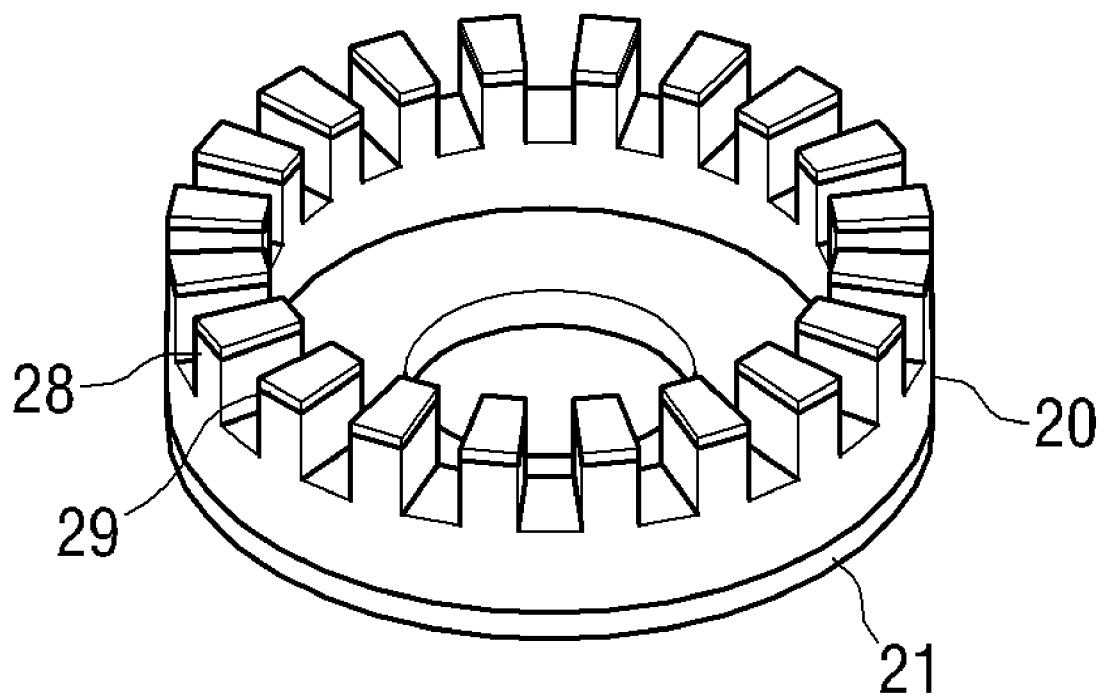
FIG. 2 is a perspective view of a vibrating element of the ultrasonic motor exemplified in FIG. 1 in accordance with an exemplary embodiment of the present invention.

As shown in FIG. 2, the vibrating element 20 is formed as a disk, and has a plurality of projections 28 formed on the side of a surface thereof coming into press contact with the friction material layer 35. An abrasion resistance-coating layer 29 is coated on contacting surfaces of the plurality of projections 28 coming in friction contact with the friction material layer 35. The abrasion resistance-coating layer 29 may be formed of a material having a superior abrasion resistance, such as Ni, Cr, ceramic, etc. The projections 28 functions to increase an amplitude of elliptic motion, which is generated on the surface of the vibrating element 20 coming into contact with the friction material layer 35 when the vibrating element 20 is vibrated by the traveling wave produced by the piezoelectric body 21.

The vibrating element 20 is formed of a Mg-based alloy having a Mg content of more than 85% by weight.

The Mg-based alloy may be formed of 1 to 15% by weight of at least one material selected from a group consisting of Al, Zn and Mn contains.

In this case, the Mg-based alloy may have one among chemical and/or metallic component contents as follows:

1. Al: 2.5 to 3.5% by weight, Zn: 0.7 to 1.3% by weight, Mn: 0.2 to 1.0% by weight, materials except the Al, the Zn, the Mn and the Mg: less than 0.3% by weight, and the Mg: remaining % by weight.

2. Al: 7.5 to 10.5% by weight, Zn: 0.4 to 2.4% by weight, Mn: 0.1 to 0.3% by weight, Si: less than 0.05% by weight, Cu: less than 0.05% by weight, Ni: less than 0.01% by weight, Fe: less than 0.01% by weight, materials except the Al, the Zn, the Mn, the Si, the Cu, the Ni, the Fe and the Mg: less than 0.3% by weight, and the Mg: remaining % by weight.

3. Al: 1.7 to 10.5% by weight, Zn: less than 0.2% by weight, Mn: 0.25 to 0.6% by weight, Si: less than 0.1% by weight, Cu: less than 0.01% by weight, Ni: less than 0.01% by weight, Fe: less than 0.01% by weight, materials except the Al, the Zn, the Mn, the Si, the Cu, the Ni, the Fe and the Mg: less than 0.3% by weight, and the Mg: remaining % by weight.

4. Mn: 0.9 to 1.5% by weight, Ca: less than 0.3% by weight, Cu: less than 0.1% by weight, Ni: less than 0.05% by weight, Si: less than 0.1% by weight, materials except the Mn, the Ca, the Cu, the Ni, the Si, and the Mg: less than 0.3% by weight, and the Mg: remaining % by weight.

5. Al: 5.8 to 6.8% by weight, Zn: 0.5 to 1.2% by weight, Mn: 0.2 to 0.5% by weight, Si: 0.01 to 0.05% by weight, Cu: less than 0.05% by weight, Ni: less than 0.05% by weight, Fe: less than 0.05% by weight, materials except the Al, the Zn, the Mn, the Si, the Cu, the Ni, the Fe and the Mg: less than 0.3% by weight, and the Mg: remaining % by weight.

6. Zn: 3.8 to 6.5% by weight, Zr: 0.1 to 1.0% by weight, materials except the Zn, the Zr and the Mg: less than 0.3% by weight, and the Mg: remaining % by weight.

In addition, the Mg-based alloy may be formed of 4 to 15% by weight of at least one material selected from a group consisting of Y (yttrium), and Nd contains. In this case, the Mg-based alloy may be formed of at least 3% by weight of the Y and at least 1% by weight of the Nd. Particularly, the Mg-based alloy may be formed of 3.5 to 5.5% by weight of the Y, 1.5 to 2.5% by weight of the Nd, 0.3 to 1.0% by weight of the Zr, less than 3% by weight of materials except the Y, the Nd, the Zr and the Mg may contain, and a remaining % by weight of the Mg.

Also, the Mg-based alloy may be formed of 0.3 to 1.0% by weight of Zr, less than 3% by weight of materials except the Zr and the Mg contains, and a remaining % by weight of the Mg.

The reason why the vibrating element 20 is formed of the Mg-based alloy having the Mg content of more than 85% by weight as described above is to reduce a weight of the vibrating element 20 and to improve a machinability of the vibrating element 20, thereby allowing a fabrication cost of the ultrasonic motor 1 to reduce and allowing the ultrasonic motor 1 to apply to much more systems and devises. In the Mg-based alloy, the machinability representing whether the material can easily be machined is 4 to 10 times as good as that of a steel material. Thus, if the vibrating element 20 is made of the Mg-based alloy, a machining time is reduced and thereby a fabrication cost is reduced. Also, to improve a strength, a hardness, a castability, etc., the Al, the Zn, the Zr, etc. are added.

In addition, to maintain a performance required in the ultrasonic motor 1, the Mg-based alloy used to form the vibrating element 20 may be formed to have a value of quality factor Q of about 100 to about 500.

Figure 3:
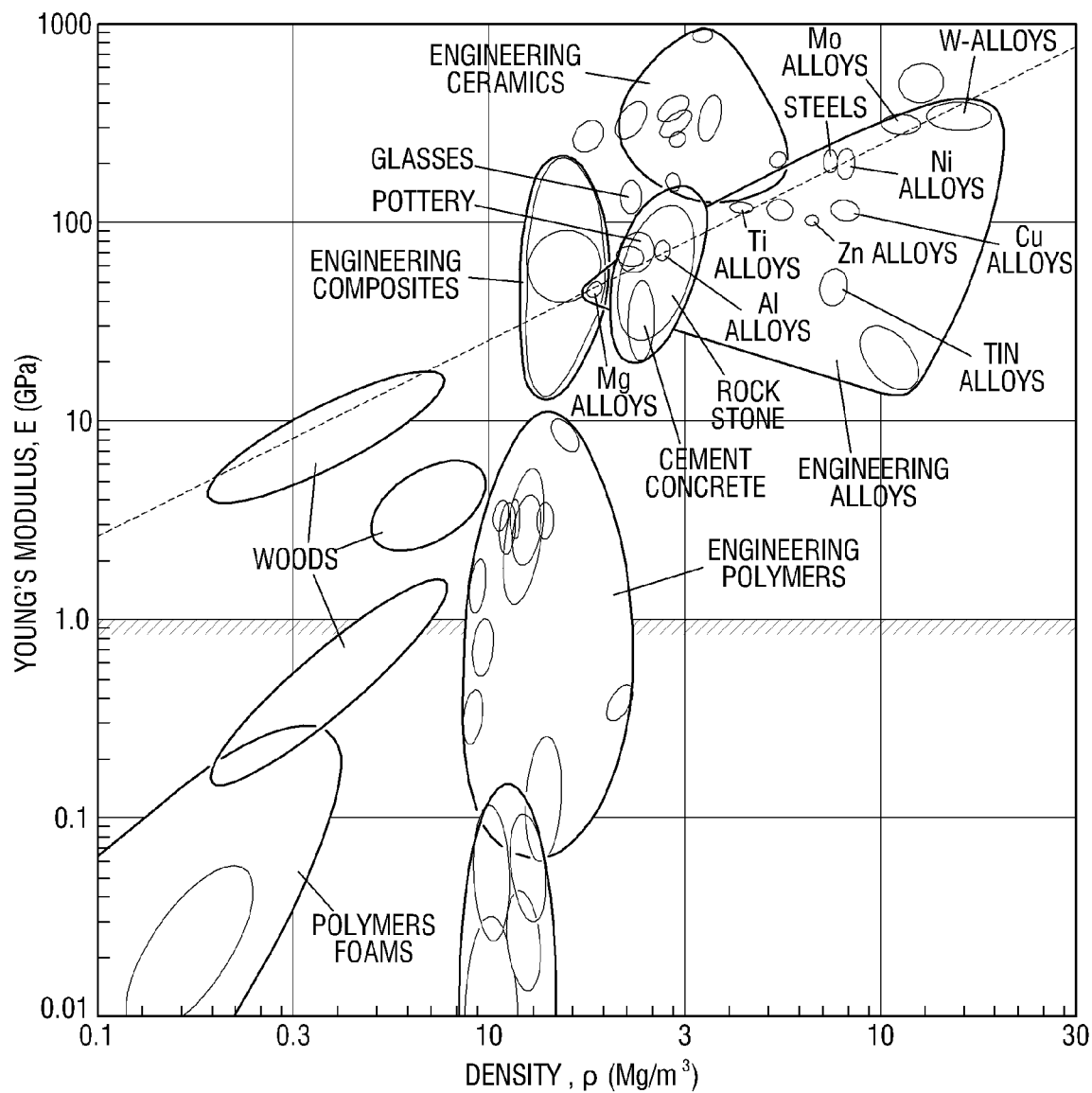
FIG. 3 is a view exemplifying a distribution of materials according to a ratio of Young's modulus per unit density.

To be more specific, because the ultrasonic motor uses a resonant vibration of more than 20 kHz, in order to allow a material of the vibrating element 20 to replace a conventionally used one with a new one in a condition that a shape is the same and a resonant frequency is maintained in the same range, for example, 30 kHz, a ratio of rigidity, that is, a ratio of Young's modulus per unit density, in material to be replaced should be considered. As shown in FIG. 3, it can be appreciated that as materials having almost the same ratio of rigidity as that of the currently-used material, for example, a steel material such as a stainless steel, there are a W-based alloy, a Mo-based alloy, a Ni-based alloy, Ti-based alloy, an Al-based alloy, a Mg-based alloy, etc.

However, all of the alloys as described above cannot be used to replace the currently used material as the material of the vibrating element 20. To find out whether the alloys can be used as the material of the vibrating element 20, it is required to compare a change in vibration magnitude, that is, a change in magnitude X of vibration displacement, generated as a result of the material replacement of the vibrating element 20

Figure 4:
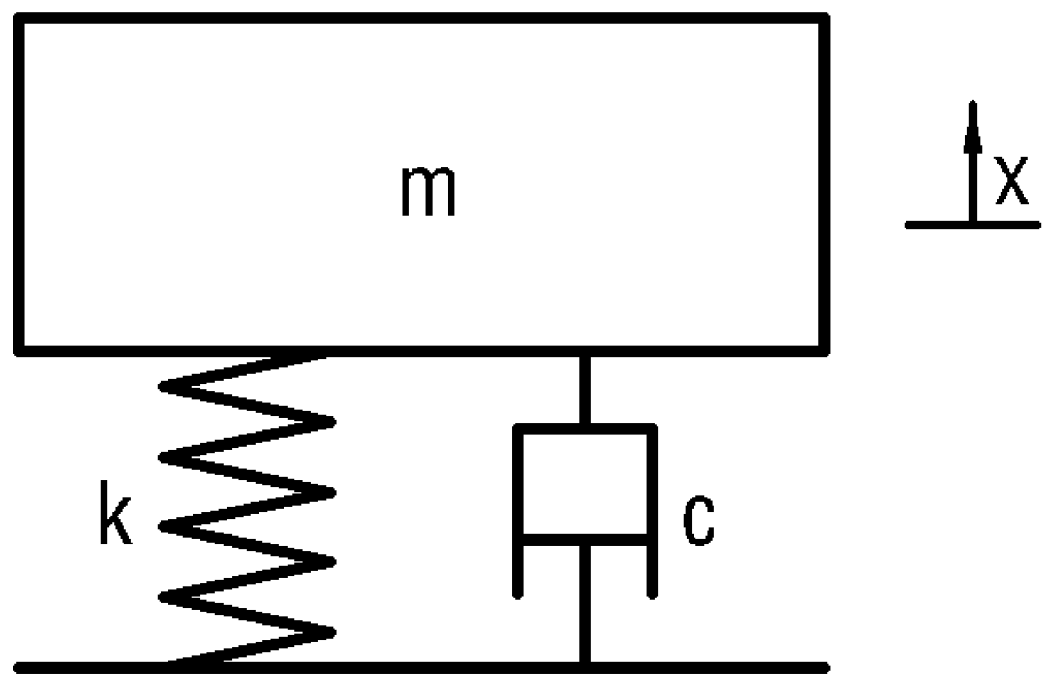
FIG. 4 is a schematic view exemplifying an example modeled in a forced vibration with damping of a single degree of freedom system from the vibrating element of FIG. 2.

That is, a vibration phenomenon of the vibrating element 20 as shown in FIG. 2 can be modeled in a forced vibration with damping of a single degree of freedom system, which a mass is m, a spring constant is k, and a viscous damping coefficient is c, as shown in FIG. 4. Thus, if a current vibrating element made of the currently used material, for example, the stainless steel, generally used as the material of vibrating element and a preliminary vibrating element made of a preliminary material to replace the currently used material as the material of the vibrating element are modeled and then compared, it can be determined whether the preliminary material can replace the currently used material, that is, the stainless steel, as the material of the vibrating element.

To be more specific, when a harmonic excitation vibration $F_0 \cos \omega t$ of the piezoelectric body is applied to the vibrating element of the single degree of freedom system as shown in FIG. 4, a response characteristic can be represented as the following governing equation (1):

$$m\ddot{x} + c\dot{x} + k = F_o \cos \omega t \tag{1}$$

Here, $\omega$ is an angular frequency and t is a time.

From the equation (1), a displacement x(t) of the vibrating element according to the time t is evaluated as the following equation (2):

$$x(t) = X \cos(\omega t - \phi) \tag{2}$$

Here, a magnitude X of vibration displacement comes to the following equation (3), and a phase deviation or shift φ is represented as the following equation (4):

$$X = \frac{F_o}{k} \frac{1}{\sqrt{(1-r^2)^2 + (2\zeta r)^2}} \quad (3)$$

$$\Phi = \arctan\left(\frac{2\zeta r}{1-r^2}\right) \quad (4)$$

Here, $r = \frac{\omega}{\omega_n}, \omega_n = \sqrt{\frac{k}{m}}, \zeta = \frac{c}{\sqrt{km}} = \frac{c}{k}\sqrt{\frac{k}{m}}$.

Thus, from the equation (3), it can be appreciated that the magnitude X of vibration displacement after and before the material replacement of the vibrating element is determined by the spring constant k, the mass m, a damping ratio ζ and a natural frequency $\omega_n$ of the vibrating element, if the shape of the vibrating elements (and the piezoelectric body) is the same.

Accordingly, to determine whether the Mg-based alloy according to the exemplary embodiment of the present invention can be used as the material of the vibrating element, it can be assumed that if, for example, the stainless steel is selected as the currently used material of the vibrating element and the Mg-based alloy according to the exemplary embodiment of the present invention having almost the same ratio of rigidity as that of the stainless steel is selected as the preliminary material to replace the currently used material of the vibrating element, a first vibrating element made of the stainless steel comes to a single degree of freedom system, which a mass is $m_1$, a spring constant is $k_1$, and a viscous damping coefficient is $c_1$, and a second vibrating element made of the Mg-based alloy comes to a single degree of freedom system, which a mass is $m_2$, a spring constant is $k_2$, and a viscous damping coefficient is $c_2$.

Therefore, a magnitude $X_1$ of vibration displacement of the first vibrating element and a magnitude $X_2$ of vibration displacement of the second vibrating element can be evaluated from the above equation (3), respectively.

At this time, it can be deduced that because the stainless steel has almost the same ratio of rigidity as that of the Mg-based alloy, natural frequencies of the two vibrating element are the same, that is, $k_1/m_1 = k_2/m_2$. Also, because shapes of piezoelectric bodies of the two vibrating element are the same, magnitudes of $F_0$ of the two vibrating element are the same.

Accordingly, the magnitude $X_1$ of vibration displacement of the first vibrating element can be evaluated from the equation (3) if a value of damping ratio ζ of the first vibrating element is given. In general, because the damping ratio ζ and a quality factor Q has a relation of 1/Q=2ζ, the value of damping ratio ζ of the first vibrating element can be evaluated if a value of quality factor Q of the stainless steel is given. Assuming that the value of quality factor Q of the stainless steel is a representative value, that is, 1000, the value of damping ratio ζ of the first vibrating element comes to 0.0005.

Figure 5:
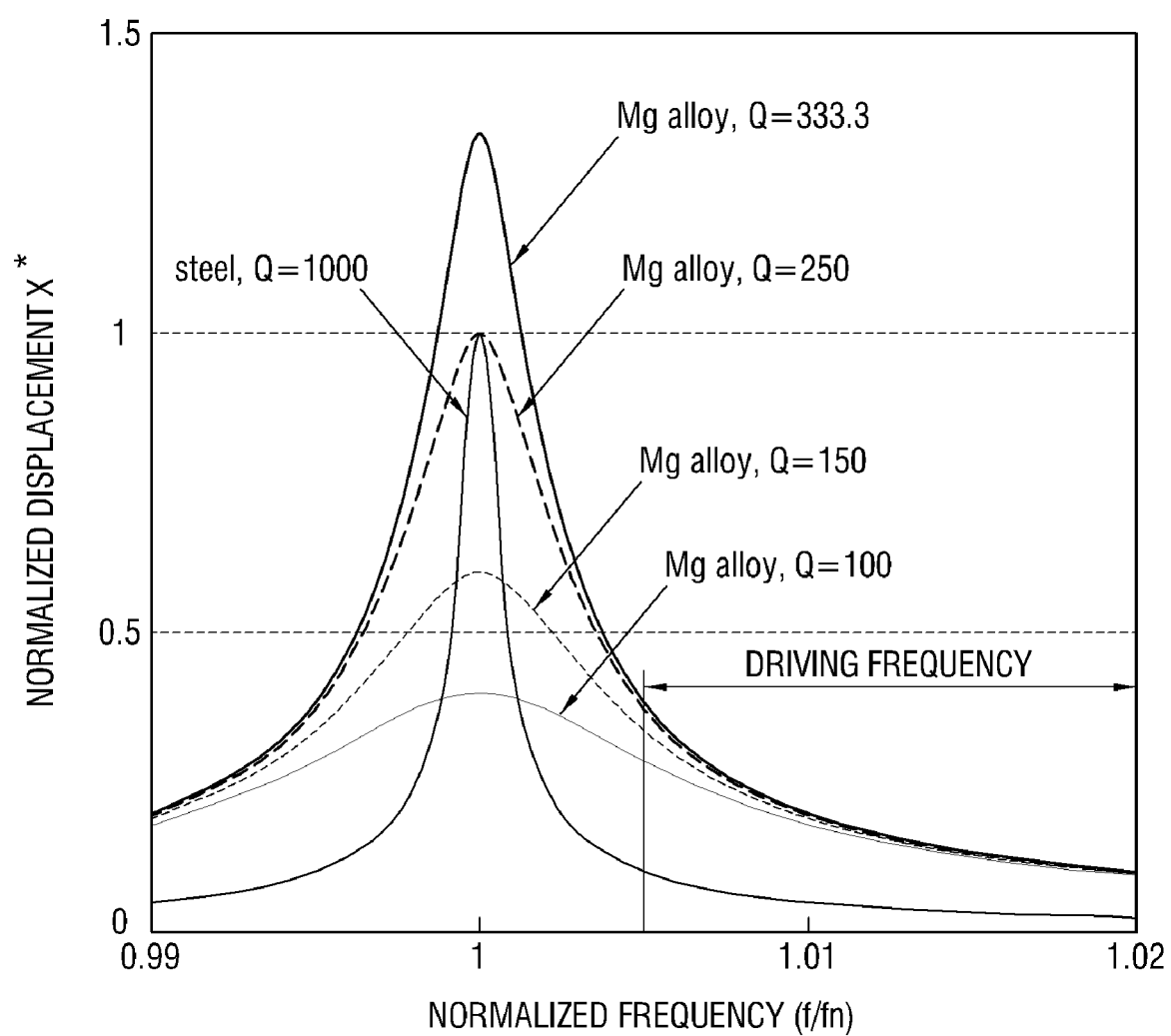
FIG. 5 is a graph exemplifying a relation between a normalized displacement and a normalized frequency in vibrating elements made of a Mg-based alloy and a vibrating element made of a stainless steel, which are modeled in the forced vibration with damping of the single degree of freedom system.

The magnitude $X_1$ of vibration displacement of the first vibrating element obtained in the manner as described above is designated as 'steel, Q=1000' in FIG. 5. In FIG. 5, a normalized frequency of horizontal axis means a value obtained by dividing a driving frequency f by a resonant frequency fn (that is, a value obtained by dividing the angular frequency ω by the natural frequency ωn) and a normalized displacement X* of vertical axis means a value obtained by dividing the magnitude $X_1$ of vibration displacement of the first vibrating element by a maximum vibration displacement of the first vibrating element, that is, $F_0/k_1$.

Also, the magnitude $X_2$ of vibration displacement of the second vibrating element for comparing with the magnitude $X_1$ of vibration displacement of the first vibrating element can be evaluated from the equation (3) if a value of spring constant $k_2$ and a value of damping ratio ζ of the second vibrating element is given. In general, the Mg-based alloy is known as having a spring constant $k_2$, which is quarter times as small as that of the stainless steel (that is, 0.25 $k_1$). From the relation (1/Q=2ζ) as described above, the damping ratio ζ can be obtained as various values according to a range of values of quality factor Q. According to modeling of the present applicant, a result was obtained, in that when the value of quality factor Q is about 100 to about 500, preferably, more than 250 (that is, the value of damping ratio ζ is about 0.001 to about 0.005, preferably, less than 0.002), the magnitude $X_2$ of vibration displacement of the second vibrating element was larger than the magnitude $X_1$ of vibration displacement of the first vibrating element in an area of the driving frequency.

The magnitudes $X_2$ of vibration displacement of the second vibrating element obtained in the manner as described above are designated as 'Mg alloy, Q=333.3', 'Mg alloy, Q=250', 'Mg alloy, Q=150', and 'Mg alloy, Q=100' in FIG. 5.

As shown in FIG. 5, in case of the Mg-based alloy having almost the same ratio of rigidity as that of the stainless steel, it can be appreciated that even though the value of quality factor Q comes to a tenth of that of stainless steel, that is, about 100, the magnitude $X_2$ of vibration displacement comes larger than the magnitude $X_1$ of vibration displacement of the stainless steel in the range of a frequency (that is, the driving frequency) in which the ultrasonic motor is actually driven, that is, the range of $1.005\omega n < \omega < 1.020\omega_n$ larger than the natural frequency ωn (that is, the resonant frequency). Such a result means that even though the value of quality factor Q is small, the Mg-based alloy can obtain a vibration displacement required in the vibrating element of the ultrasonic motor because the ratio of rigidity thereof is very lower than that of the stainless steel. If the value of quality factor Q is less than 100, the Mg-based alloy can also have a vibration displacement larger than that of the stainless steel. However, in this case, a loss by damping becomes serious, so it is not desirable.

In addition, if the vibrating element is formed of a Mg-based alloy having a value of quality factor Q, that is, 250, which is lower as much as the reduced ratio of rigidity of the stainless steel, a speed control of the ultrasonic motor in a change in frequency comes more stable because a non-linearity of vibration displacement is reduced at the driving frequency while a magnitude of vibration displacement is getting larger.

Also, because the magnitude $X_2$ of vibration displacement in the Mg-based alloy is larger than the magnitude $X_1$ of vibration displacement in the stainless steel at all values of the quality factor Q between about 100 and about 500, if the Mg-based alloy is used to form the vibrating element, a light-weight ultrasonic motor, which can be driven in a high speed and a high torque, can be fabricated.

Example 1

Figure 6:
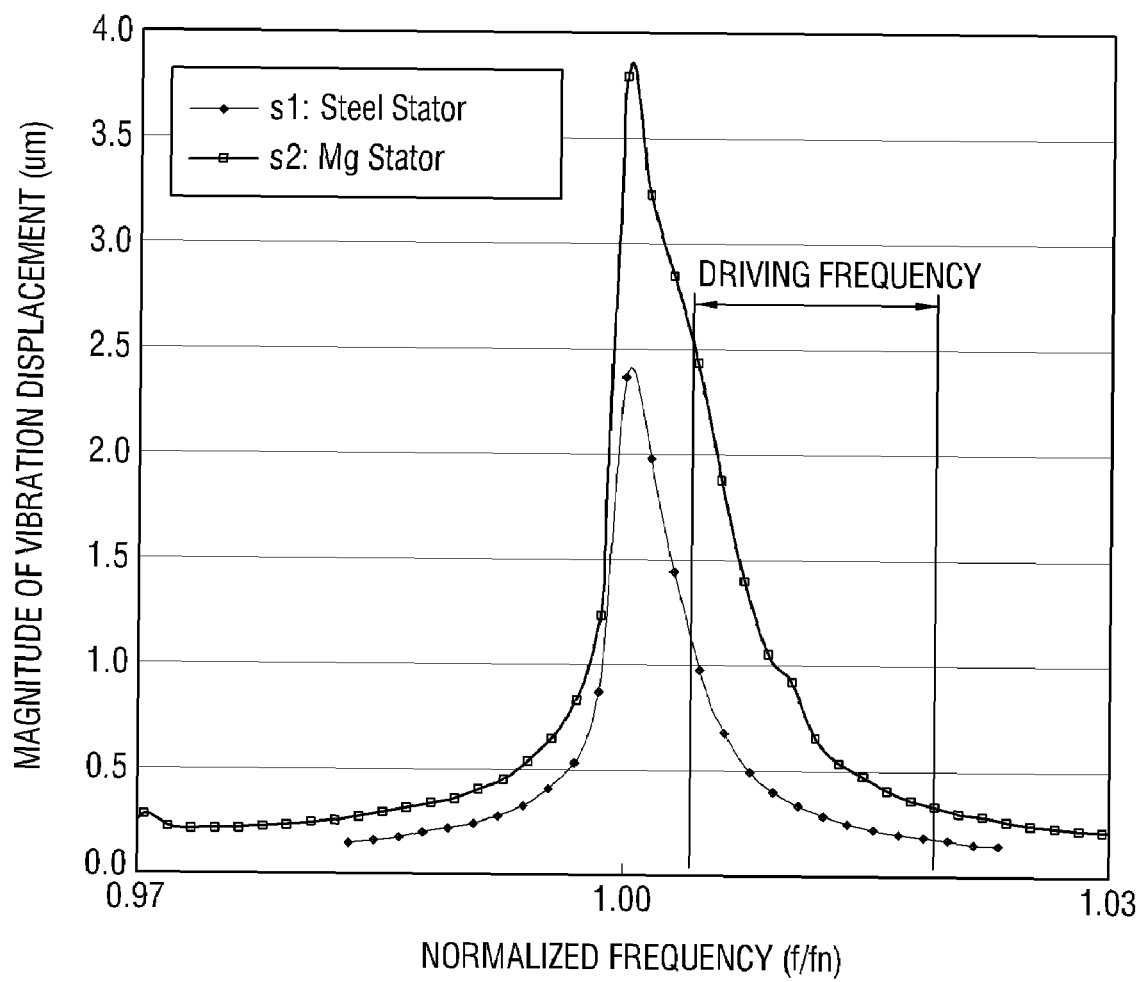
FIG. 6 is a graph exemplifying a relation between a magnitude of vibration displacement and a normalized frequency in a vibrating element made of a Mg-based alloy in accordance with the exemplary embodiment of the present invention and a vibrating element made of a stainless steel in accordance with a comparison example.

A vibrating element s2 of 9 grams was fabricated in the shape shown in FIG. 2 by a Mg-based alloy AZ31, which has a value of quality factor Q of 250 and contains 3% by weight of Al, 1% by weight of Zn, 0.2 to 1.0% by weight of Mn, less than 0.3% by weight of materials except the Al, the Zn, the Mn and Mg, and a remaining % by weight of the Mg. After an alternating voltage of 12.5V was applied to a piezoelectric body of the fabricated vibrating element, a vibration displacement and a frequency were measured with a laser dripper vibrator, and a result as shown in FIG. 6 was obtained. In FIG. 6, a normalized frequency of horizontal axis means a value obtained by dividing a driving frequency f by a resonant frequency fn (that is, a value obtained by dividing the angular frequency ω by the natural frequency ωn) and a vertical axis means a magnitude of measured vibration displacement.

As shown in FIG. 6, in the vibrating element of the Mg-based alloy AZ31, the resonant frequency was 33.85 kHz, which is almost the same as 32.45 kHz of a vibrating element of a comparison example s1, but the vibration displacement was superior, compared with that of the vibrating element of the comparison example s1. The vibrating element of the comparison example s1 was fabricated in 40 grams of weight and the same shape as that of the Mg-based alloy AZ31 by a stainless steel SUS420, which has a value of quality factor Q of 360.

As described above, when the vibrating element is fabricated with the Mg-based alloy having the Mg content of more than 85% by weight and/or the value of quality factor (Q) of about 100 to about 500, the ultrasonic motor to which the vibrating element of the Mg-based alloy is mounted can be greatly reduced in weight because a specific gravity (1.7-1.8 g/cm2) of the Mg-based alloy is only 22% of the stainless steel and only 66% of Al. Accordingly, the ultrasonic motor to which the vibrating element of the Mg-based alloy is used can be applied to various systems or devices required to reduce a weight for user's convenience.

Further, because the Mg-based alloy has a high machinability, five times as much as that of the stainless steel, it reduces a machining cost in forming of the vibrating element, and thus a fabrication cost of the ultrasonic motor is reduced.

Also, because the Mg-based alloy has a thermal conductivity larger than that of the stainless steel, the vibrating element, if formed of the Mg-based alloy, can easily radiate a friction heat generating when it comes in contact with the contacting element.

Hereinafter, an operation of the ultrasonic motor 1 in accordance with the exemplary embodiment of the present invention constructed as described above will be explained with reference to FIGS. 1 and 2.

First, when an alternating voltage is applied to the piezoelectric body 21 of the vibrating element 20, a traveling wave is produced on the piezoelectric body 21 such that the piezoelectric body 21 generates minute displacements or deformations in the form of the traveling wave. As a result, the vibrating element 20 having the piezoelectric body 21 attached thereon also vibrates while generating minute displacements or deformations in the form of the traveling wave.

As the vibrating element 20 vibrates, the plurality of projections 28 formed on the vibrating element 20 also vibrate, and rotates the contacting element 30 while coming in contact with the contacting element 30. As the contacting element 30 rotates, the rotary shaft 18 connected to the contacting element 30 rotates. As a result, an apparatus (not shown) connected to the rotary shaft 18 to be driven by the rotary shaft 19 is rotated.

Although exemplary embodiments of the present invention have been shown and described, it will be appreciated by those skilled in the art that changes may be made in the embodiment without departing from the principles and spirit of the invention, the scope of which is defined in the claims and their equivalents.

What is claimed is:

1. An ultrasonic motor comprising:
   a vibrating element;
   a piezoelectric body which is attached to the vibrating element and produces a traveling wave when the piezoelectric body is supplied with an electric power; and
   a contacting element which comes into friction contact with the vibrating element when the vibrating element is vibrated by the traveling wave,
   wherein the vibrating element is formed of a Mg-based alloy comprising more than 85% by weight of Mg.

2. The ultrasonic motor as claimed in claim 1, wherein the vibrating element has a quality factor Q of about 100 to about 500.

3. The ultrasonic motor as claimed in claim 2, wherein the quality factor Q is more than 250.

4. The ultrasonic motor as claimed in claim 1, wherein the Mg-based alloy comprises 1% to 15% by weight of at least one material selected from a group consisting of Al, Zn and Mn.

5. The ultrasonic motor as claimed in claim 4, wherein the Mg-based alloy comprises 2.5 to 3.5% by weight of the Al, 0.7 to 1.3% by weight of the Zn, 0.2 to 1.0% by weight of the Mn, less than 0.3% by weight of materials other than the Al, the Zn, the Mn and the Mg, and a remaining % by weight of the Mg.

6. The ultrasonic motor as claimed in claim 4, wherein the Mg-based alloy comprises 7.5 to 10.5% by weight of the Al, 0.4 to 2.4% by weight of the Zn, 0.1 to 0.3% by weight of the Mn, less than 0.05% by weight of Si, less than 0.05% by weight of Cu, less than 0.01% by weight of Ni, less than 0.01% by weight of Fe, less than 0.3% by weight of materials other than the Al, the Zn, the Mn, the Si, the Cu, the Ni, the Fe and the Mg, and a remaining % by weight of the Mg.

7. The ultrasonic motor as claimed in claim 4, wherein the Mg-based alloy comprises 1.7 to 10.5% by weight of the Al, less than 0.2% by weight of the Zn, 0.25 to 0.6% by weight of the Mn, less than 0.1% by weight of Si, less than 0.01% by weight of Cu, less than 0.01% by weight of Ni, less than 0.01% by weight of Fe, less than 0.3% by weight of materials other than the Al, the Zn, the Mn, the Si, the Cu, the Ni, the Fe and the Mg, and a remaining % by weight of the Mg.

8. The ultrasonic motor as claimed in claim 4, wherein the Mg-based alloy comprises 0.9 to 1.5% by weight of the Mn, less than 0.3% by weight of Ca, less than 0.1% by weight of Cu, less than 0.05% by weight of Ni, less than 0.1% by weight of Si, less than 0.3% by weight of materials other than the Mn, the Ca, the Cu, the Ni, the Si, and the Mg, and a remaining % by weight of the Mg.

9. The ultrasonic motor as claimed in claim 4, wherein the Mg-based alloy comprises 5.8 to 6.8% by weight of the Al, 0.5 to 1.2% by weight of the Zn, 0.2 through 0.5% by weight of the Mn, 0.01 through 0.05% by weight of Si, less than 0.05% by weight of Cu, less than 0.05% by weight of Ni, less than 0.05% by weight of Fe, less than 0.3% by weight of materials other than the Al, the Zn, the Mn, the Si, the Cu, the Ni, the Fe and the Mg, and a remaining % by weight of the Mg.

10. The ultrasonic motor as claimed in claim 4, wherein the Mg-based alloy comprises 3.8 to 6.5% by weight of the Zn, 0.1 to 1.0% by weight of the Zr, less than 0.3% by weight of materials other than the Zn, the Zr and the Mg, and a remaining % by weight of the Mg.

11. The ultrasonic motor as claimed in claim 1, wherein the Mg-based alloy comprises 4 to 15% by weight of at least one material selected from a group consisting of Y and Nd.

12. The ultrasonic motor as claimed in claim 11, wherein the Mg-based alloy comprises at least 3% by weight of the Y and at least 1% by weight of the Nd.

13. The ultrasonic motor as claimed in claim 12, wherein the Mg-based alloy comprises 3.5 to 5.5% by weight of the Y, 1.5 to 2.5% by weight of the Nd, 0.3 to 1.0% by weight of Zr, less than 3% by weight of materials other than the Y, the Nd, the Zr and the Mg, and a remaining % by weight of the Mg.

14. The ultrasonic motor as claimed in claim 1, wherein the Mg-based alloy comprises 0.3 to 1.0% by weight of Zr, less than 3% by weight of materials other than the Zr and the Mg, and a remaining % by weight of the Mg.

15. The ultrasonic motor as claimed in claim 1, wherein the vibrating element further comprises an abrasion resistance-coating layer coated on a contacting surface coming into friction contact with the contacting element.

16. An ultrasonic motor comprising:
   a vibrating element;
   a piezoelectric body which is attached to the vibrating element and produces a traveling wave when the piezoelectric body is supplied with an electric power; and
   a contacting element in which comes into friction contact with the vibrating element when the vibrating element is vibrated by the traveling wave,
   wherein the vibrating element is formed of a Mg-based alloy having a quality factor Q of about 100 to about 500.

17. The ultrasonic motor as claimed in claim 16, wherein the quality factor Q is more than 250.

* * * * *